United States Patent [19]
Dumas

[11] Patent Number: 6,008,474
[45] Date of Patent: Dec. 28, 1999

[54] HEATED WINDSHIELD WIPER SYSTEM

[76] Inventor: Thomas L. Dumas, 33 S. Avon, Apt. 1, St. Paul, Minn. 55105

[21] Appl. No.: 09/260,102

[22] Filed: Mar. 2, 1999

[51] Int. Cl.$^6$ ........................................................ H05B 3/84
[52] U.S. Cl. ........................................ 219/203; 15/250.07
[58] Field of Search ............................ 49/200, 201, 202; 219/203; 15/250.05, 250.06, 250.07

[56] References Cited

U.S. PATENT DOCUMENTS

| | | | |
|---|---|---|---|
| 2,443,849 | 6/1948 | Childs | 219/203 |
| 5,412,177 | 5/1995 | Clark | 219/203 |

*Primary Examiner*—Tu Ba Hoang

[57] ABSTRACT

A heated windshield wiper system for eliminating ice and snow accumulation upon a windshield wiper thereby preventing interference with the wiper's operation. The inventive device includes a heat exchanger for engagement with a heated portion of a vehicle such as an engine manifold, a fan connected to the heat exchanger, an exchange tube fluidly connected to the fan opposite of the heat exchanger, a plurality of air channels within the wiper frame fluidly connected to the wiper frame, a blade member removably attached to the wiper frame, an air passageway within the blade member fluidly connected to the exchange tube, and a plurality of vents within the blade member and connected to the air passageway from releasing the warm air conducted by the heat exchanger. The warm air prevents ice and snow from accumulating upon the wiper frame or wiper blade. In an alternative embodiment, the exchange tube may be directly connected to a blower manifold of the vehicle's heat system.

19 Claims, 5 Drawing Sheets

HEATED WINDSHIELD WIPER SYSTEM

BACKGROUND OF THE INVENTION

1. Field of the Invention

The present invention relates generally to windshield wipers and more specifically it relates to a heated windshield wiper system for eliminating ice and snow accumulation upon a windshield wiper thereby preventing interference with the wiper's operation.

Windshield wipers are utilized upon vehicles that have windshields in order to maintain a clear view for the driver of the vehicle from rain or snow. During cold weather, precipitation accumulates upon the windshield wiper, including the wiper blade, thereby preventing the windshield wiper blade from making contact with the windshield thereby leaving a "blurred" windshield that is extremely dangerous for drivers. Therefore, there is a need for a windshield wiper blade assembly that is not prone to freezing precipitation during cold weather.

2. Description of the Prior Art

Windshield wipers have been in use for years. Typically, a conventional windshield wiper will include a wiper arm, a wiper frame attached to the wiper arm, and a rubber wiper blade removably attached to the wiper frame. During use, the wiper arm is powered by an actuator in a cyclical motion thereby "cleaning" the outside of the windshield from rain and snow. During cold weather conditions, the rain and snow will build up on the windshield wiper and the rubber wiper blade causing large streaks across the windshield effectively blocking the driver's vision.

To remove the accumulated ice and snow from the windshield wiper, the driver of the vehicle often times will stop the vehicle and "snap" the windshield wiper upon the windshield in an attempt to break apart the accumulated ice and snow. Often times a portion of the accumulated ice and snow will remain upon the windshield wiper making it still difficult for the driver to navigate the vehicle.

In these respects, the heated windshield wiper system according to the present invention substantially departs from the conventional concepts and designs of the prior art, and in so doing provides an apparatus primarily developed for the purpose of eliminating ice and snow accumulation upon a windshield wiper thereby preventing interference with the wiper's operation.

SUMMARY OF THE INVENTION

In view of the foregoing disadvantages inherent in the known types of windshield wipers now present in the prior art, the present invention provides a new heated windshield wiper system construction wherein the same can be utilized for eliminating ice and snow accumulation upon a windshield wiper thereby preventing interference with the wiper's operation.

The general purpose of the present invention, which will be described subsequently in greater detail, is to provide a new heated windshield wiper system that has many of the advantages of the windshield wipers mentioned heretofore and many novel features that result in a new heated windshield wiper system which is not anticipated, rendered obvious, suggested, or even implied by any of the prior art windshield wipers, either alone or in any combination thereof.

To attain this, the present invention generally comprises a heat exchanger for engagement with a heated portion of a vehicle such as an engine manifold, a fan connected to the heat exchanger, an exchange tube fluidly connected to the fan opposite of the heat exchanger, a plurality of air channels within the wiper frame fluidly connected to the wiper frame, a blade member removably attached to the wiper frame, an air passageway within the blade member fluidly connected to the exchange tube, and a plurality of vents within the blade member and connected to the air passageway from releasing the warm air conducted by the heat exchanger. The warm air prevents ice and snow from accumulating upon the wiper frame or wiper blade. In an alternative embodiment, the exchange tube may be directly connected to a blower manifold of the vehicle's heat system.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a heated windshield wiper system that will overcome the shortcomings of the prior art devices.

Another object is to provide a heated windshield wiper system that reduces the accumulation of ice and snow upon a windshield wiper including the wiper blade.

An additional object is to provide a heated windshield wiper system that increases a driver's visibility while driving in cold weather conditions.

A further object is to provide a heated windshield wiper system that can be utilized during both cold and warm weather conditions.

Another object is to provide a heated windshield wiper system that is affordable and marketable for the average consumer.

A further object is to provide a heated windshield wiper system that is capable of utilizing the vehicle's existing heat system for providing heat to the windshield wiper including the wiper blade.

Another object is to provide a heated windshield wiper system that can either be installed directly upon new vehicles or retrofitted upon existing wiper frames.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
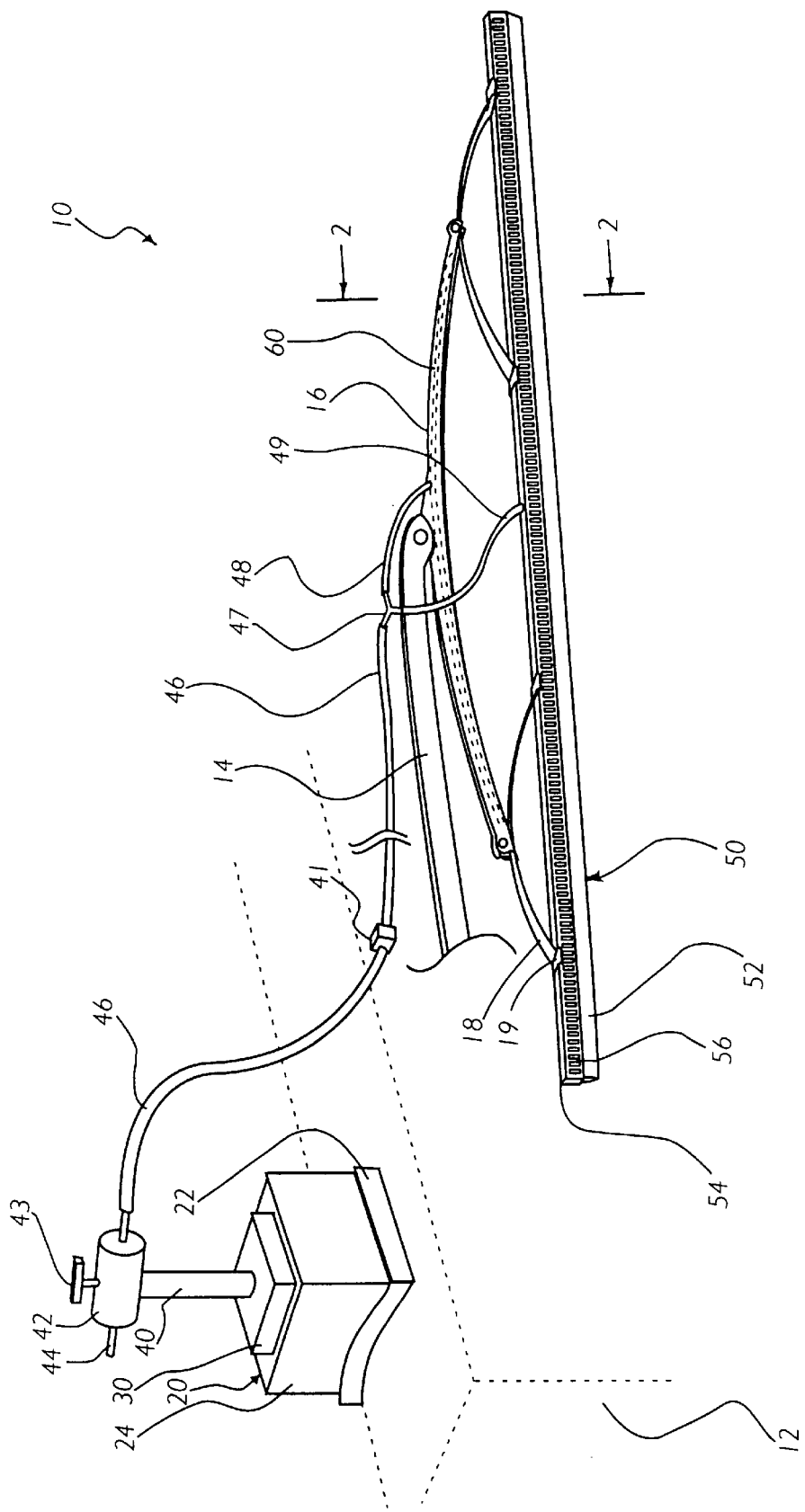
FIG. 1 is an upper perspective view of the present invention showing the heat exchanger upon an engine manifold of a vehicle for conducting the manifold's heat.

Turning now descriptively to the drawings, in which similar reference characters denote similar elements throughout the several view, FIGS. 1 through 5 illustrate a heated windshield wiper system 10, which comprises a heat exchanger 20 for engagement with a heated portion of a vehicle such as an engine manifold 12, a fan connected to the heat exchanger 20, an exchange tube 40 fluidly connected to the fan opposite of the heat exchanger 20, a plurality of air channels 60 within the wiper frame 16 fluidly connected to the wiper frame 16, a blade member 50 removably attached to the wiper frame 16, an air passageway 58 within the blade member 50 fluidly connected to the exchange tube 40, and a plurality of vents 56 within the blade member 50 and connected to the air passageway 58 from releasing the warm air conducted by the heat exchanger 20. The warm air prevents ice and snow from accumulating upon the wiper frame 16 or wiper blades. In an alternative embodiment, the exchange tube 40 may be directly connected to a blower manifold 13 of the vehicle's heat system.

Figure 2:
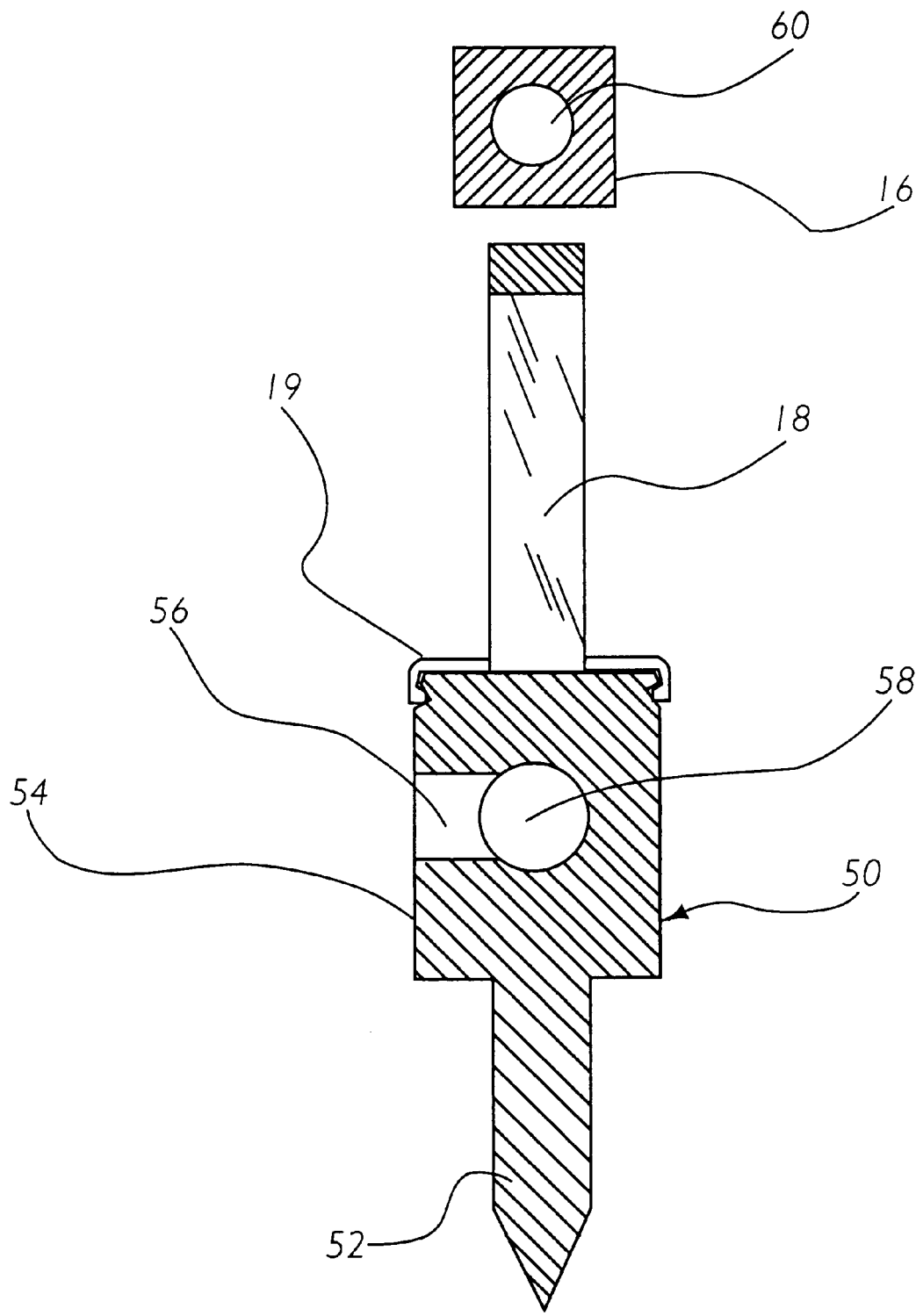
FIG. 2 is a cross sectional view taken along line 2—2 of FIG. 1 showing the air passageway within the blade member.

A conventional windshield wiper comprises a motorized wiper arm 14, a wiper frame 16 attached to the wiper arm 14, a plurality of spring members 18 attached to wiper frame 16, and a blade member 50 catchably secured to the spring members 18 by a plurality of clamps 19 as shown in FIGS. 1 and 2 of the drawings.

As shown in FIG. 1 of the drawings, the heat exchanger 20 includes a base 22 and a heat chamber 24. The base 22 preferably has a curved edge for allowing outside air to enter the heat exchanger 20 as it is heated by the engine manifold 12 or other object from the vehicle. The heat exchanger 20 is attached to the engine manifold 12 by any well-known attachment means. The heat chamber 24 is attached to the base 22 as shown in FIG. 1 of the drawings.

As shown in FIG. 1 of the drawings, the heat exchanger 20 preferably has a rectangular shape, however it can be appreciated by one skilled in the art that any well-known shape may be utilized. Steel wool or other heat conductive material that allows air to freely pass through may be utilized within the heat chamber 24 for retaining and releasing heat after the vehicle engine has been turned off for an extended period of time.

Figure 4:
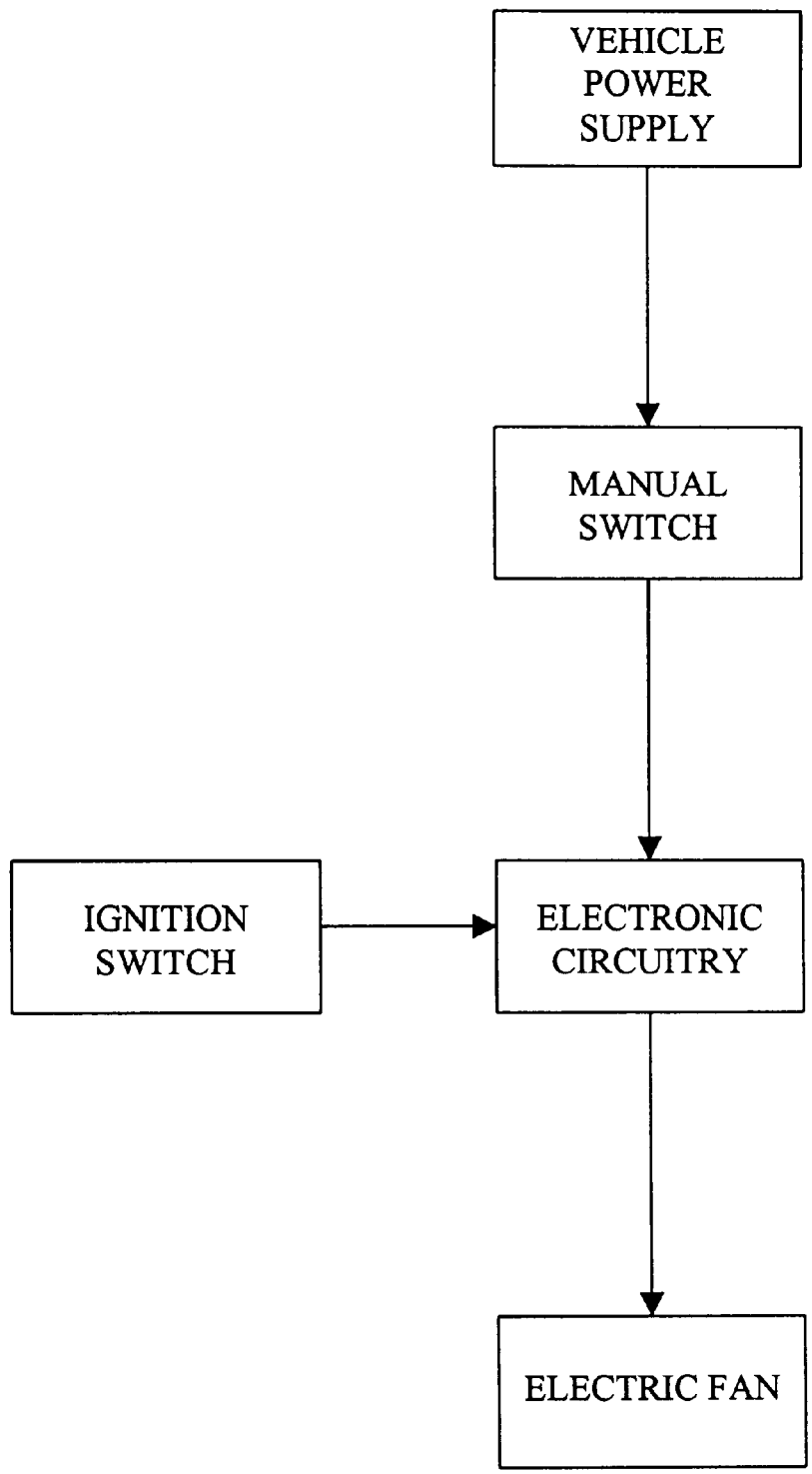
FIG. 4 is a block diagram of the present invention showing the electrical connections.

As shown in FIG. 1, a fan is preferably fluidly connected to the top of the heat chamber 24 for drawing the heated air from within the heat exchanger 20. However, it can be appreciated by one skilled in the art that a fan may not be needed since the heated air will rise by itself into the exchange tube 40. As shown in FIG. 4 of the drawings, the fan is electrically connected to and controlled by an electronic circuitry. The electronic circuitry receives electrical power through a manual switch that is electrically connected to the vehicle's power supply. The user is able to terminate power to the electric fan manually through the manual switch. The electronic circuitry preferably automatically controls the electric fan when the vehicle is turned off for providing heated air to the windshield wiper for a specified period of time.

As shown in FIG. 1 of the drawings, an exchange tube 40 is fluidly connected to the fan for receiving the heated air. A release valve 42 is fluidly connected to the exchange tube 40 opposite of the fan for allowing the user to divert the heated air through the release tube 44 during warm weather conditions so as to not damage the windshield wiper by simply manipulating the valve handle 43.

As shown in FIG. 1, an air line 46 is fluidly connected to the release valve 42 opposite of the release tube 44 for receiving the heated air forced through the release valve 42 by the fan. A low temperature thermostat 41 is preferably positioned within the air line 46 for diverting air that is below a predetermined temperature such as 45 degrees Fahrenheit. The thermostat 41 is also to keep the blade from over heating by diverting air that is above a predetermined temperature such as 70 degrees Fahrenheit.

As further shown in FIG. 1 of the drawings, a divider 47 is fluidly connected to the distal end of the air line 46 for dividing the air line 46 into two channels for providing heated air to both the wiper frame 16 and the blade member 50. A frame tube 48 is fluidly connected to the divider 47 and connected to the wiper frame 16 at the opposite end fluidly connecting to a plurality of air channels 60 within the wiper frame 16. The heated air flows through the wiper frame 16 thereby increasing the temperature of the wiper frame 16 and the heated air is then extended through the lower portions of the wiper frame 16 toward the blade member 50.

As further shown in FIG. 1 of the drawings, a blade tube 49 is fluidly connected to the divider 47 and connected to the blade member 50 for providing heated air to the blade member 50. The blade member 50 includes a blade body 54 and a blade edge 52. The blade body 54 is attached to the clamps 19 of the spring members 18. The blade edge 52 is narrower than the blade body 54 and engages the outside surface of the windshield for acting as a "squeegee" for removing precipitation from the windshield.

As shown in FIGS. 1 and 2 of the drawings, the blade body 54 includes at least one air passageway 58 that is fluidly connected to the blade tube 49 for distributing the heated air throughout the blade body 54 and the blade edge 52. A plurality of vents 56 are preferably within the blade body 54 on opposing side for dispensing the heated air from within the air passageway 58 as shown in FIG. 2 of the drawings. The plurality of vents 56 release the heated air near the blade edge 52 thereby melting any accumulated ice or snow for allowing proper operation of the blade member 50.

Figure 3:
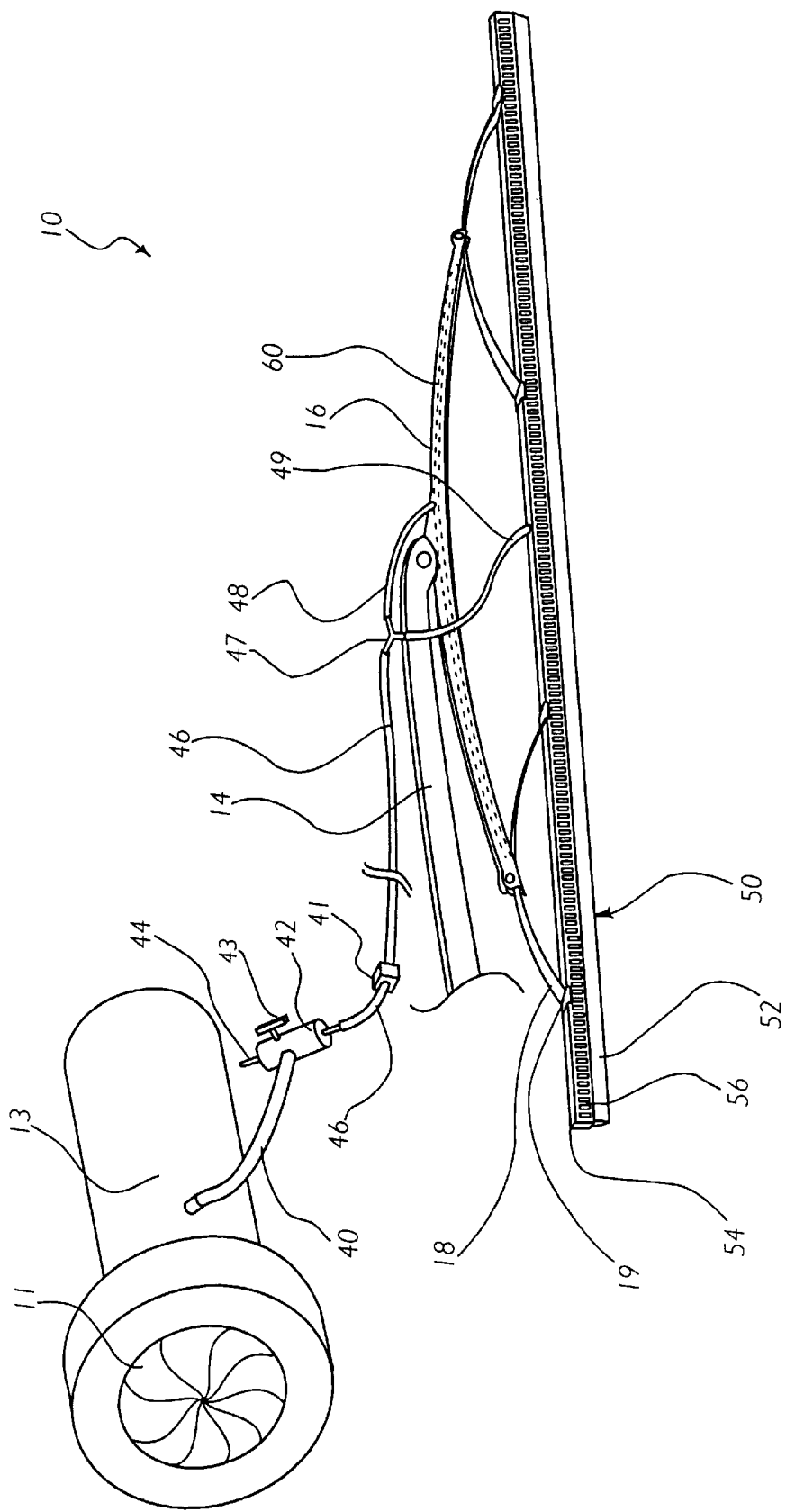
FIG. 3 is an upper perspective view of a second embodiment showing the exchange tube directly connected to a blower manifold of the vehicle's heating system.

In a first alternative embodiment shown in FIG. 3 of the drawings, the exchange tube 40 is fluidly connected to a conventional blower manifold 13 of a heater blower 11 from the heating system of the vehicle. The heated air from the heating system of the vehicle is thereafter diverted into the exchange tube 40 where after it is dispersed through the vents 56 and apertures within the wiper frame 16.

Figure 5:
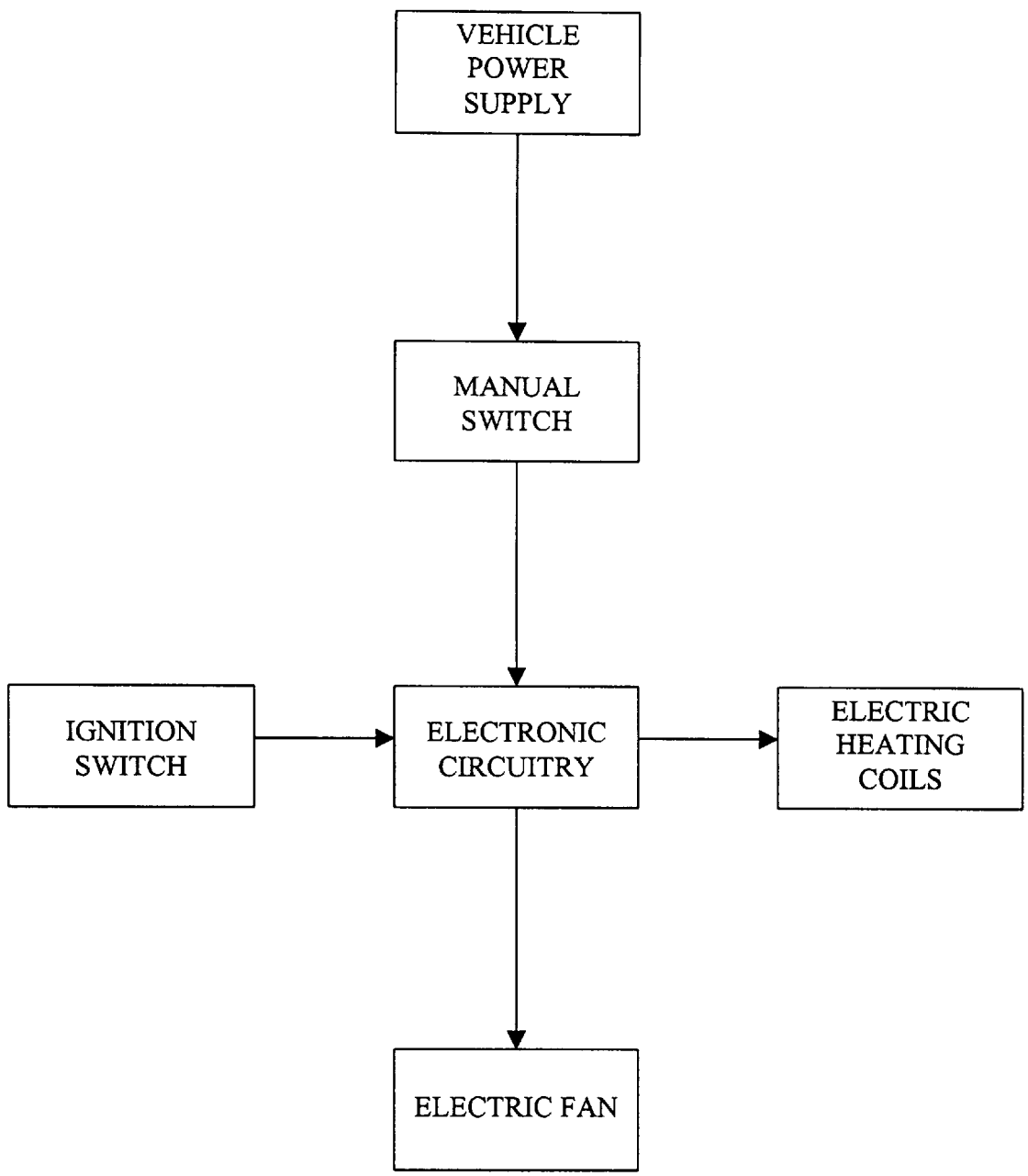
FIG. 5 is a block diagram of a third embodiment of the present invention showing the electrical connections.

In a second alternative embodiment shown in FIG. 5 of the drawings, a plurality of electric heating coils are positioned within the heat exchanger 20. The heating coils are electrically connected to the electronic circuitry as shown in FIG. 5 of the drawings. The heat exchanger 20 does not have to be positioned adjacent a warm surface such as an engine manifold 12 if the heating coils are utilized. The heating coils may also be positioned within the exchange tube 40 for heating the air forced by the fan.

In use, the user manipulates the manual switch during cold weather to activate the electronic circuitry. When the user manipulates the ignition switch, the electronic circuitry detects that the user has started the vehicle. The electronic circuitry waits a predetermined period of time prior to providing electrical power to the fan in order to allow the vehicle to generate the required heat. After the predetermined period of time has expired, the electronic circuitry activates the electric fan that draws the heated air from the heat exchanger 20 into the exchange tube 40. The heated air is then forced through the air line 46 where it is diverted into the wiper frame 16 and the blade body 54. The heated air circulates through the wiper frame 16 preventing the buildup of ice or snow thereon as with the blade member 50. The heated air is forced through the vents 56 connected to the air passageway 58 thereby removing accumulated ice and snow from the blade member 50 to allow proper utilization of the blade member 50. When the user turns the ignition switch off, the electronic circuitry provides electrical power for a second period of time after vehicle operation has terminated in order to prevent the accumulation of ice and snow while sitting. After the expiration of the second period of time, the electronic circuitry terminates electrical power to the fan. If the fan is not utilized, the heated air within the heat exchanger 20 simply rises through the air line 46 into the blade member 50 since the blade member 50 is higher in elevation than the heat exchanger 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A heated windshield wiper system comprising:
   a blade member having a blade body and a blade edge attachable to a wiper frame;
   at least one air passageway within said blade member;
   a heat source fluidly connected to said at least one passageway; and
   wherein said blade member includes a plurality of vents fluidly connected to said at least one passageway.

2. The heated windshield wiper system of claim 1, wherein said plurality of vents are positioned within said blade body.

3. The heated windshield wiper system of claim 2, wherein said heat source comprises:
   a heat exchanger attachable adjacent a heated vehicle structure for conducting heat from said heated vehicle structure; and
   an air line fluidly connected between said heat exchanger and said blade member for transferring heated air to said blade member.

4. The heated windshield wiper system of claim 3, wherein said heat source further includes:
   a fan fluidly attached to said heat exchanger and electrically connected to an electronic circuitry; and
   wherein said electronic circuitry is electrically connected to a power source within said vehicle.

5. The heated windshield wiper system of claim 4, wherein said electronic circuitry is electrically connected to the ignition switch for detecting when said vehicle is in operation or non-operation.

6. The heated windshield wiper system of claim 5, including a manual switch electrically connected between said electronic circuitry and said power source.

7. The heated windshield wiper system of claim 6, including:
   at least one air channel within said wiper frame;
   a divider fluidly connected to the distal end of said air line;
   a first tube fluidly connected between said divider and said at least one air channel; and
   a second tube fluidly connected between said divider and said at least one passageway within said blade member.

8. The heated windshield wiper system of claim 7, including a release valve within said air line for allowing a user to divert said heated air during warm weather.

9. The heated windshield wiper system of claim 8, including a lower temperature thermostat for diverting cold air from within said air line.

10. The heated windshield wiper system of claim 9, wherein said electronic circuitry does not activate said fan for a first period of time after said vehicle is started, and wherein said electronic circuitry does not deactivate said fan for a second period of time after said vehicle is stopped.

11. The heated windshield wiper system of claim 10, wherein said vents are a plurality of parallel aligned slots.

12. The heated windshield wiper system of claim 2, wherein said heat source comprises an existing heating system within said vehicle.

13. The heated windshield wiper system of claim 12, wherein said heat source further includes an air line fluidly connected between a blower manifold of said existing heating system and said blade member.

14. The heated windshield wiper system of claim 13, including:
   at least one air channel within said wiper frame;
   a divider fluidly connected to the distal end of said air line;
   a first tube fluidly connected between said divider and said at least one air channel; and
   a second tube fluidly connected between said divider and said at least one passageway within said blade member.

15. The heated windshield wiper system of claim 14, including a release valve within said air line for allowing a user to divert said heated air during warm weather.

16. The heated windshield wiper system of claim 15, including a lower temperature thermostat for diverting cold air from within said air line.

17. The heated windshield wiper system of claim 2, wherein said heat source comprises:
- a heat exchanger attachable adjacent a heated vehicle structure for conducting heat from said heated vehicle structure;
- at least one electric heating coil positioned within said heat exchanger and electrically connected to an electronic circuitry; and
- an air line fluidly connected between said heat exchanger and said blade member for transferring heated air to said blade member; and wherein said electronic circuitry is electrically connected to a power source within said vehicle.

18. The heated windshield wiper system of claim 17, wherein said heat source further includes a fan fluidly attached to said heat exchanger and electrically connected to said electronic circuitry.

19. The heated windshield wiper system of claim 18, wherein said electronic circuitry is electrically connected to the ignition switch for detecting when said vehicle is in operation or non-operation.

* * * * *